United States Patent [19]

Banker et al.

[11] Patent Number: 5,301,028
[45] Date of Patent: Apr. 5, 1994

[54] METHOD AND APPARATUS FOR DISPLAYING CHANNEL IDENTIFICATION INFORMATION

[75] Inventors: Robert O. Banker, Cumming; Kinney C. Bacon, Lawrenceville; Julius B. Bagley, Marietta, all of Ga.

[73] Assignee: Scientific-Atlanta, Inc., Norcross, Ga.

[21] Appl. No.: 800,002

[22] Filed: Nov. 29, 1991

[51] Int. Cl.$^5$ .............................................. H04N 5/50
[52] U.S. Cl. ...................... 348/570; 455/185.1; 455/158.5; 348/731
[58] Field of Search ............... 358/191.1, 192.1, 193.1, 358/194.1, 86, 183; 455/185, 186.2, 4.2, 2, 158.4, 158.5; H04N 5/50, 5/44

[56] References Cited

U.S. PATENT DOCUMENTS

| | | | |
|---|---|---|---|
| 3,636,315 | 1/1972 | Comeau | 235/61.7 |
| 3,956,579 | 5/1976 | Doumit | 178/6 |
| 4,079,419 | 3/1978 | Siegle et al. | 358/193 |
| 4,228,541 | 10/1980 | Snedkerud et al. | 455/158.5 |
| 4,305,101 | 12/1981 | Yarbrough et al. | 360/69 |
| 4,536,791 | 8/1985 | Campbell et al. | 358/122 |
| 4,599,644 | 7/1986 | Fischer | 455/2 |
| 4,623,887 | 11/1986 | Welles, II | 340/825.57 |
| 4,633,297 | 12/1986 | Skerlos et al. | 358/22 |
| 4,641,205 | 2/1987 | Beyers, Jr. | 360/33.1 |
| 4,686,564 | 8/1987 | Masuko et al. | 358/86 |
| 4,701,794 | 10/1987 | Froling et al. | 358/183 |
| 4,706,121 | 11/1987 | Young | 358/142 |
| 4,718,107 | 1/1988 | Hayes | 455/4 |
| 4,751,578 | 6/1988 | Reiter et al. | 358/183 |
| 4,821,102 | 4/1989 | Ichikawa et al. | 358/183 |
| 4,825,200 | 4/1989 | Evans et al. | 341/23 |
| 4,825,209 | 4/1989 | Sasaki et al. | 340/825.72 |
| 4,831,552 | 5/1989 | Scully et al. | 364/518 |
| 4,890,321 | 12/1989 | Seth-Smith et al. | 455/4.2 |
| 4,908,707 | 3/1990 | Kinghorn | 358/191.1 |
| 4,914,517 | 4/1990 | Duffield | 358/191.1 |
| 4,924,498 | 5/1990 | Farmer et al. | 380/15 |
| 4,959,719 | 9/1990 | Strubbe et al. | 358/183 |
| 4,959,720 | 9/1990 | Duffield et al. | 358/191.1 |
| 4,963,994 | 10/1990 | Levine | 358/335 |
| 4,977,455 | 12/1990 | Young | 358/142 |
| 4,987,486 | 1/1991 | Johnson et al. | 358/86 |
| 4,991,011 | 2/1991 | Johnson et al. | 358/141 |
| 5,010,406 | 4/1991 | Kawakami et al. | 358/183 |
| 5,014,125 | 5/1991 | Pocock et al. | 358/86 |
| 5,027,211 | 6/1991 | Robertson | 358/183 |
| 5,031,045 | 7/1991 | Kawasaki | 358/191.1 |
| 5,038,211 | 8/1991 | Hallenbeck | 358/142 |
| 5,047,867 | 9/1991 | Strubbe et al. | 358/183 |
| 5,065,235 | 12/1991 | Iijima | 358/86 |
| 5,077,607 | 12/1991 | Johnson et al. | 358/86 |
| 5,081,680 | 1/1992 | Bennett | 380/50 |
| 5,109,279 | 4/1992 | Ando | 358/183 |
| 5,113,259 | 5/1992 | Romesburg et al. | 358/183 |
| 5,151,789 | 9/1992 | Young | 358/194.1 |
| 5,152,012 | 9/1992 | Schwab | 455/158.5 |
| 5,247,364 | 9/1993 | Banker et al. | 358/191.1 |

FOREIGN PATENT DOCUMENTS

| | | | |
|---|---|---|---|
| 0373297 | 8/1989 | European Pat. Off. | H04N 7/087 |
| 90/15507 | 6/1990 | PCT Int'l Appl. | H04N 7/173 |

Primary Examiner—Mark R. Powell
Assistant Examiner—Jeffrey S. Murrell
Attorney, Agent, or Firm—Frederick W. Powers, III

[57] ABSTRACT

A subscriber terminal includes a receiver for receiving a television signal including video, audio, and data information. A channel of the television signal may be selected for display on the television. A memory stores channel identification information such as channel identifiers. The channel identifiers include at least one display character. A processor establishes a relationship between channel identification information and channel numbers associated with channels of the television signal. An on-screen display control circuit controls the display of character information on the television and has the capability of overlaying the channel number and the channel identification information on the video portion of a selected channel displayed on the television for a predetermined period of time. Program identification information such as program titles may also be displayed. Alternatively or additionally, the channel identification information may be displayed on a display such an LED display of a subscriber terminal.

32 Claims, 11 Drawing Sheets

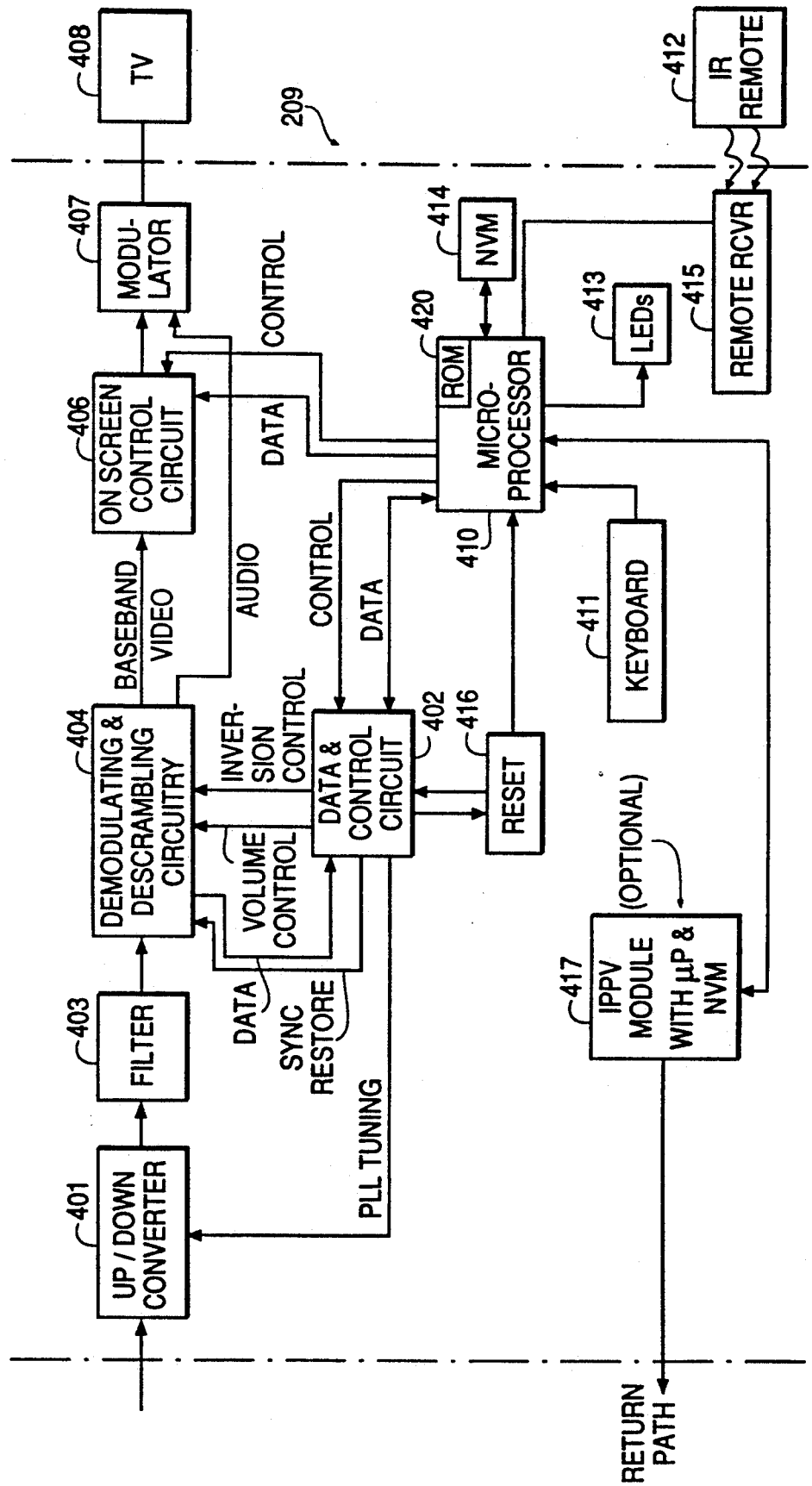

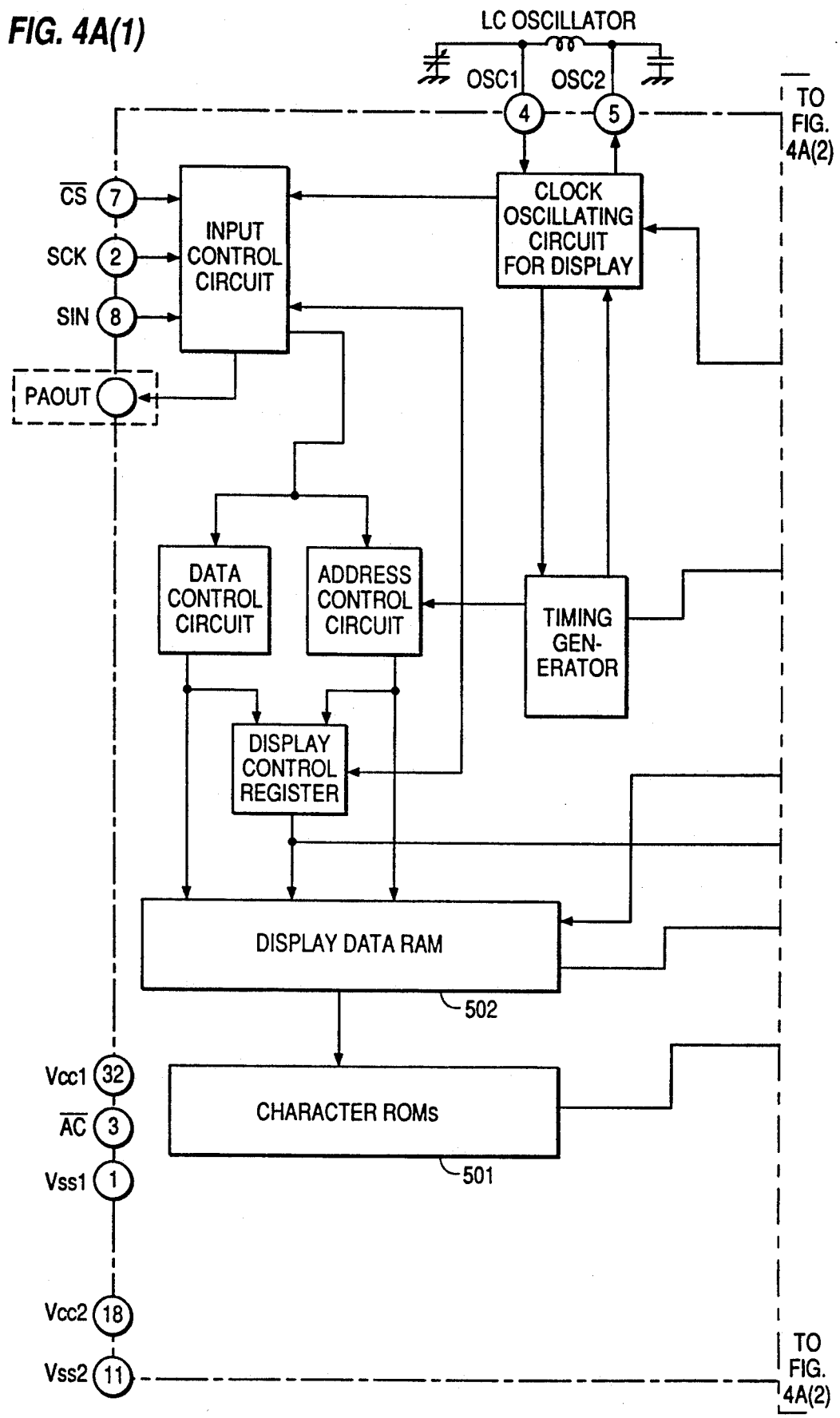
FIG. 4A(1)

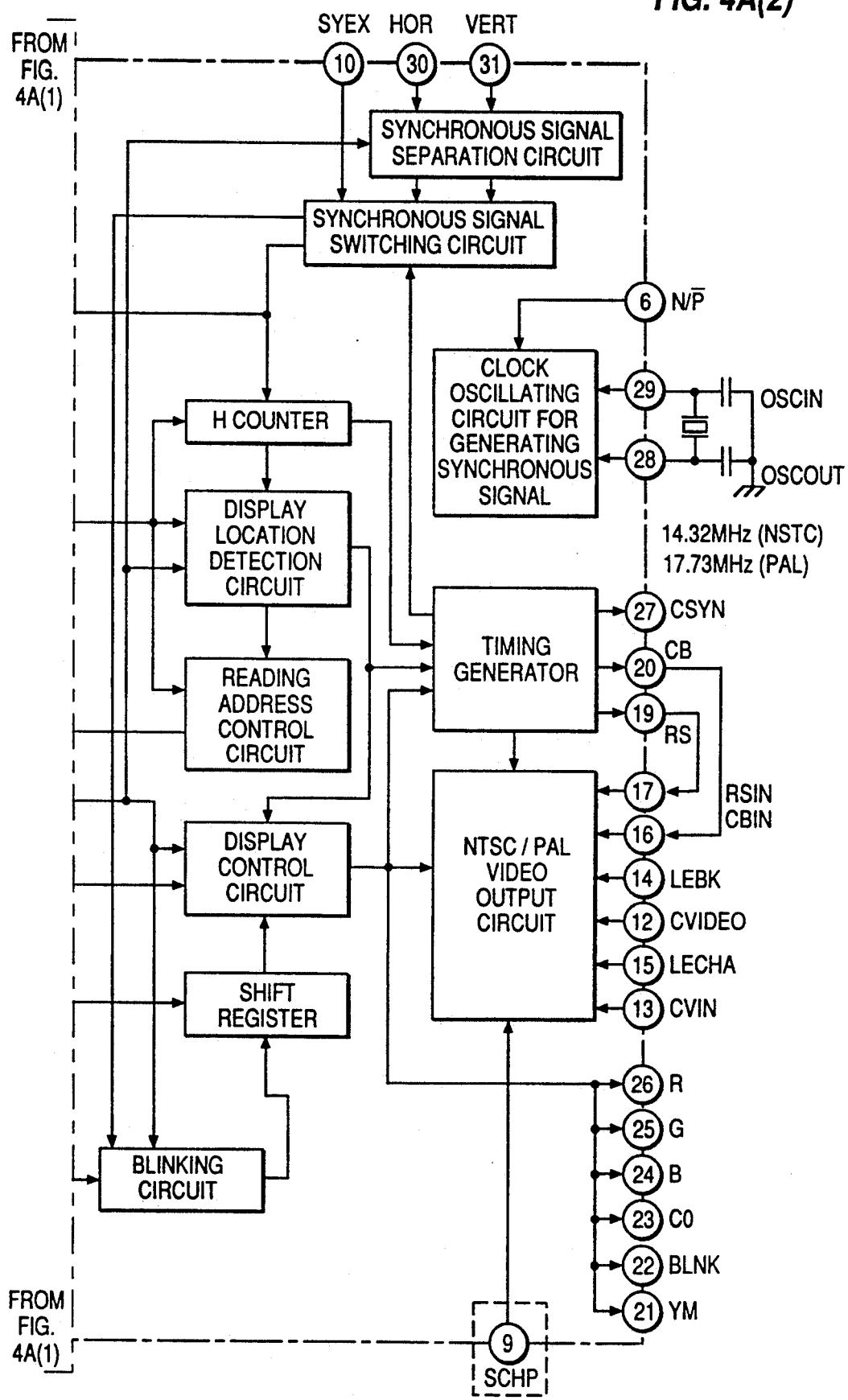
FIG. 4A(2)

FIG. 4C

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 | 240 |

|  ID #'S | TIME |  |
|---|---|---|
| . | . | . |
| . | . | . |
| . | . | . |
| . | . | . |
| . | . | . |
| . | . | . |

NVM 414

PROGRAM IDENTIFIERS

METHOD AND APPARATUS FOR DISPLAYING CHANNEL IDENTIFICATION INFORMATION

TECHNICAL FIELD

The present invention generally relates to a subscription television system and, more particularly, to a method and apparatus for displaying channel identification information such as CBS, NBC, and ABC when a subscriber selects a channel for viewing on his or her television.

BACKGROUND OF THE INVENTION

As the cable industry has grown, cable operators are continuing to configure their systems to offer more channels having programming for both general and targeted audiences. Some systems now offer more than one hundred different channels. Not surprisingly, one of the most frequent actions performed by a television viewer is channel selection and changing. Thus, a viewer may consult a programming guide and select a desired program for viewing or may switch around to a number of channels until finding a program for viewing.

Each system operator of a cable system sets up the relationship of channel numbers to program sources in a different manner and program guides utilized by subscribers are set up according per network in units of time. Thus, it is desirable that a viewer by provided some information about the channel he or she is viewing. To this end, subscriber converters in cable television typically include a display such as an LED display which indicates the channel number associated with the channel selected by a viewer. Similarly, many televisions now include the capability of displaying the channel number at, for example, the upper right corner of the screen, when a channel is tuned. However, while this feedback may indicate to a viewer which channel number has been tuned, it provides no indication of the program on the channel or its origin. A viewer must utilize a program guide, for example, to ascertain information about the program or rely on memory as to which channel numbers are associated with MTV, CBS, NBC, etc.

SUMMARY OF THE INVENTION

Accordingly, it is an object of the present invention to provide a method and apparatus for providing channel identification information such as network and local station identifiers when a viewer selects a channel for viewing.

It is another object of the present invention to overlay channel identification information such as network and local station identifiers on the video portion of a channel displayed on a television when the channel is selected by a subscriber.

It is another object of the present invention to provide channel identification information on a display such as an LED display of a subscriber terminal utilized by a subscriber in a subscription television system.

In accordance with the present invention, a subscriber terminal includes a receiver for receiving a television signal including video, audio, and data information. A channel of the television signal may be selected for display on the television. A memory stores channel identification information such as channel identifiers. The channel identifiers include at least one display character. A processor establishes a relationship between channel identification information and channel numbers associated with channels of the television signal. An on-screen display control circuit controls the display of character information on the television and has the capability of overlaying the channel number and channel identification information on the video portion of a selected channel displayed on the television for a predetermined period of time. Alternatively or additionally, the channel identification information may be displayed on a display such an LED display of a subscriber terminal.

This arrangement displays to a viewer information in addition to channel number of the programming on a particular channel. Thus, not only does a viewer know he or she has selected channel 2, but is also informed that this channel is CBS for example. This is of great benefit to viewers since they may know the source of the program they are looking for, but not the channel number on which it is found. Thus, for example, a subscriber may know that Monday Night Football is shown on Monday nights on ABC at 9:00, but not know which channel number carries ABC programming in the system in which he is a subscriber.

Also in accordance with the present invention, a headend includes a transmitter for transmitting a television signal including video, audio, and data information. Channel identification information such as channel identifiers is generated. Each channel identifier includes at least one display character. A relationship is established between the channel identification information and channel numbers associated with channels of the television signal. The relationship is converted to data for transmission to the subscriber terminal.

This permits a system operator to generate and download channel identification information which may be displayed on a television at a subscriber location. In particular, it permits a system operator to provide local channel identification information relating to local channels and to associate the local channel identification information and channel identification information which may be provided in memory of a subscriber terminal with channels numbers of the channels in the system. A system operator may also download a program schedule against which a real time clock is compared. Thus, when a subscriber tunes a particular channel at a particular time, he may be provided with an indication of the title of the program which he is viewing.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings.

FIG. 3 is a block diagram of a baseband subscriber terminal which may be used to implement the present invention.

FIGS. 4A(1) and 4A(2) are block diagrams of the on-screen display control of FIG. 3.

FIG. 4C illustrates the configuration of the on-screen display.

DETAILED DESCRIPTION OF THE PREFERRED EMBODIMENT

Figure 1:
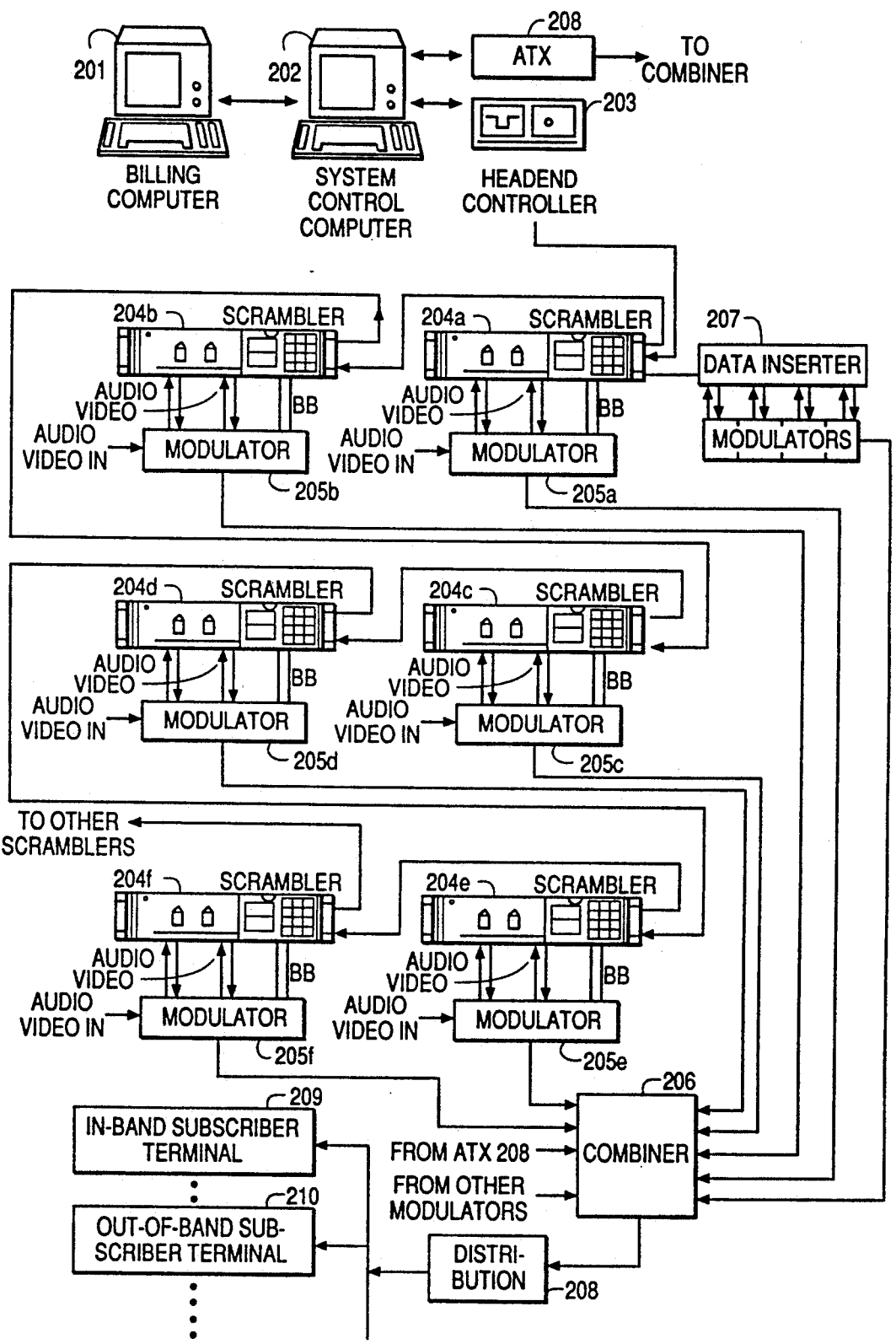
FIG. 1 is a block diagram of a headend for an in-band cable television system which may be used to implement the present invention.

FIG. 1 is a block diagram of a subscription television system in which the the present invention may be implemented. Billing computer 201 includes a subscriber database and generates a monthly bill for the subscribers in the system based on level of service and any pay-per-view and impulse pay-per-view purchases. System control computer 202 such as an HP-1000 is interfaced to billing computer 201. System control computer 202 receives transactions such as authorization transactions from billing computer 201 and formats and forwards transactions to headend controller 203 and addressable transmitter (ATX) 208. System control computer 202 also generates system set-up parameters such as scrambled channels. System control computer 202 configures tuning frequencies of the channels provided to the subscribers and controls on-screen display as described in greater detail below. A system control computer interface is responsible for gathering and appropriately routing the data leaving the system control computer 202. Out-of-band data is sent to addressable transmitter 208 and in-band data is sent to headend controller 203.

Addressable transmitter 208 transmits data to out-of-band subscriber terminals via a dedicated FM data channel such as a 108.2 megahertz data channel in the cable television distribution system. This channel, known as the data carrier, is used to transmit both addressable commands intended for a particular out-of-band subscriber terminal and global commands intended for all out-of-band subscriber terminals in the system. Out-of-band subscriber terminals contain a receiver that is listening to the commands sent over this data channel. Unlike the in-band transactions described in detail below below, out-of-band subscriber terminals receive data over this channel no matter what channel the subscriber terminal is tuned to.

Headend controller 203 is coupled to system control computer 202 and formats system control computer transactions for scramblers 204a-204f. Headend controller 203 stores all transactions and has the ability to perform continuous refreshes. The requirement to constantly, repetitively and efficiently transmit the information base arises since there is no permanently tuned data channel for in-band data transactions. Thus, all information flow to the in-band subscriber terminals is subject to the indeterminate availability of a data path to the in-band subscriber terminals. However, to further complicate matters, some of the information is real time critical, i.e. it may pertain to events that currently in progress or it may be critical to maintenance or service changes. Other information, although less time critical in nature, may be of considerable value. Some information is pertinent only to certain of the data streams while certain information causes a write to nonvolatile memory in the in-band subscriber terminals and must be sent at minimal intervals.

Different groups of data are transmitted on a serial data channel from headend controller 203 to the scramblers. These data groups or data streams are: (1) OFF channel data, (2) barker channel data, (3) pay-per-view (PPV) channel data, (4) premium channel data, (5) scroll channel data, and (6) message channel data. Reference should be made to U.S. Pat. No. 5,058,160, incorporated herein, for details of data streams (1)–(4). Data streams (5) and (6) relate to the communication of message information from a system operator to subscribers and are discussed in greater detail in a commonly assigned application Ser. No. 07/799,987 entitled "Method and Apparatus for Providing Message Information to Subscribers in a Cable Television System" filed Nov. 29, 1991 and incorporated herein by reference. Each data stream has a unique group address that is received only by scramblers having a matching address. For instance, premium channel data may have a group address of 01, and therefore all scramblers on premium channels should have a group address of 01. Headend controller 103 determines which data is output in each data stream. In an alternative embodiment, scroll channel data and message channel data may be provided to scramblers 204e and 204f on a separate channel in order to maintain a high data rate for the information in data streams (1)–(4).

Scramblers 204a–204f are coupled to headend controller 203 and may be used to selectively scramble television signals for improved security in a subscription television system that is equipped with appropriate descramblers. The video, for example, may be scrambled in any manner known in the art including sync suppression and video inversion. For illustrative purposes only, it is assumed that scramblers 204a–204f respectively correspond only to data streams (1)–(6) identified above. The outputs of scramblers 204a–204f are respectively supplied to modulators 205a–205f. The outputs of modulators 205a–205f are supplied to combiner 206 which outputs a television signal for distribution over distribution system 208 to both in-band subscriber terminals 209 and out-of-band subscriber terminals 210. Data from scramblers, e.g., 204a, can also be provided to data inserter 207 for the transmission of in-band data on non-scrambled channels.

Figure 2:
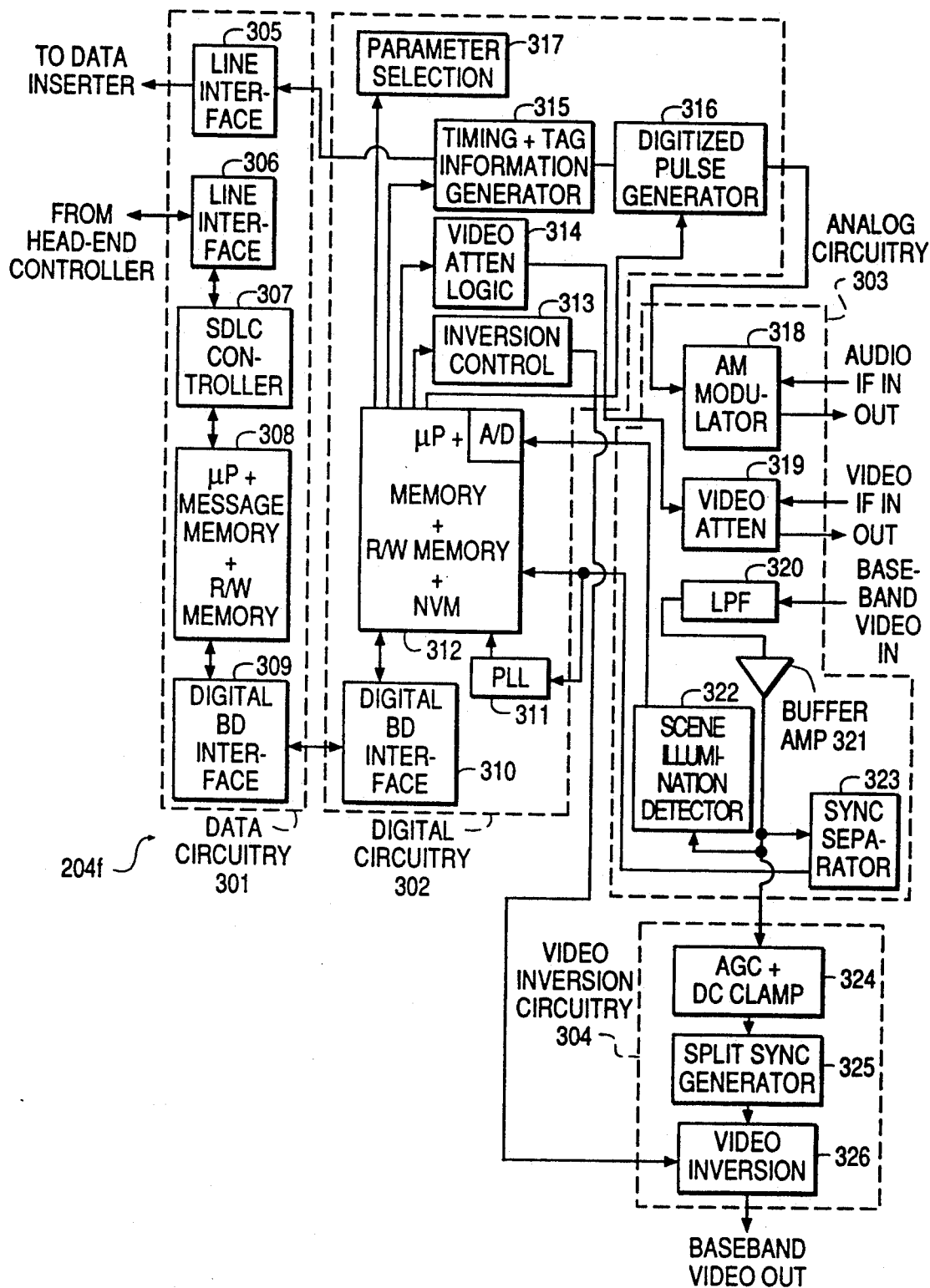
FIG. 2 is block diagram of scrambler 204f shown in FIG. 1.

FIG. 2 is a block diagram of scrambler 204f shown in FIG. 1. Scrambler 204f receives message channel data from headend controller 203. The message channel data includes character information for display screens which may be addressed to one or more subscriber terminals for display on an associated television. Scrambler 204f includes data circuitry 301, digital circuitry 302, analog circuitry 303, and video inversion circuitry 304. Data circuitry 301 includes line interfaces 305 and 306, synchronous data link control (SDLC) 307, microprocessor 308, and digital circuit interface 309, SDLC 307 controls communication via line interface 306 between scrambler 204f and headend controller 203. Microprocessor 308 receives and processes information from SDLC 307. Information such as message information is stored in non-volatile message memory of microprocessor 308. To ensure sufficient memory for message data, there is preferably at least 128K of non-volatile message memory, Read/write memory of microprocessor 308 stores temporary information. Interface circuit 309 interfaces the data circuitry 301 to the digital circuitry 302.

Digital circuitry 302 includes interface circuit 310, phase locked loop 311, microprocessor 312, inversion control circuit 313, video attenuation logic 314, timing and tag information generator 315, digitized pulse generator 316, and parameter selection circuit 317. Interface circuit 310 interfaces digital circuitry 302 with data circuitry 301. Microprocessor 312 controls all essential functions and features of scrambler 204f. Microprocessor 312 extracts and processes message data from the data circuitry 301 and controls the scrambling modes of the system. Digitized pulse generator 316 generates the specific pulses placed on the sound carrier via the analog circuitry under the control of microprocessor 312. These pulses represent authorization and control information, descrambling information including timing pulses, and message information. Microprocessor 312 is also coupled to parameter selection circuitry 317 which may be a front panel display and keyboard which permits an operator to select various modes of operation, e.g., scrambling.

Analog circuitry 303 includes AM modulator 318, video attenuation circuitry 319, low pass filter 320, buffer amplifier 321, scene illumination detector 322, and synchronization separator 323. AM modulator 318 modulates the pulses from pulse generator 316 onto an audio IF signal from modulator 205f and outputs the modulated signal to modulator 205f. Video attenuation circuitry 319 selectively provides sync suppression type scrambling and attenuates a video IF signal from modulator 205f under the control of video attenuation logic 314.

Baseband video input is filtered with low pass filter 320 which may be a sharp cut-off phase equalized low pass filter. Low pas filter 320 removes high frequency noise that can interfere with the baseband video. After filtering, the video is amplified back to its original level by video amplifier 321. Sync separator 323 extracts synchronization information which is then sent to microprocessor 312 to provide timing information such as composite and vertical sync and add/even field indication. Scene illumination detector 322 determines the average luminance level of a scene, which level is supplied to and A/D converter of microprocessor 312. Microprocessor 312 uses this luminance information to detect scene changes in order to determine when scrambling modes may optimally be changed. The composite synchronization signal is supplied to the input of phase locked loop (PLL) 311. Phase locked loop 311 locks the system clock to the line rate.

The baseband video signal from amplifier 321 is also supplied to video inversion circuitry 304. Video inversion circuitry 304 includes automatic gain control (AGC) and DC clamping circuitry 324, split sync generator 325, and video inversion circuit 326. The AGC of circuit 324 adjusts the incoming signal to a predetermined value such as 1 V peak to peak. The DC clamping of circuitry 324 forces the bottom of the sync tip to be at ground. The output of circuitry 324 is supplied to a split synchronization circuit 325. The details of split synchronization circuitry is discussed in detail in commonly assigned U.S. Pat. No. 4,924,498, incorporated herein by reference. The output of split synchronization circuitry 325 is provided to inverting circuitry 326 for inverting the baseband video about an inversion axis. Inversion is controlled in accordance with signals from inversion control circuit 313.

Scrambler 204e receives scroll channel data from headend controlled 203. The scroll channel data includes character information which defines barker screens which have been designed by the system operator on system control computer 202. Scrambler 204e is configured in the same manner as scrambler 204f but need not include a 128K memory. Rather, a 32K of non-volatile memory may be utilized. Scramblers 204e and 204f respectively store the scroll channel data and message channel data and continuously output the data on the corresponding scroll and message channels. Since the scroll channel data and the message channel data preferably define a plurality of barker and message screens, the stored data is output in a loop. Thus, if there are 8 barker screens, the information for the first screen is followed by the information for the second screen and so on. When the information for the eight screen is sent, it is followed by the information for the first screen. A similar loop is established for the message channel data. Details of scramblers 204a-204d may be found in the above-identified U.S. Pat. No. 5,058,160.

FIG. 3 is a block diagram illustrating the components of a subscriber terminal 209 in accordance with the present invention. Although the subscriber terminal is described below as a baseband subscriber terminal, it will be apparent that other subscriber terminals such as RF subscriber terminals may be utilized. The signal from distribution system 208 is supplied to up/down converter 401. Up/down converter 401 uses a phase locked loop under the control of data and control circuit 402 to convert a selected RF input signal to a 4.5 megahertz signal. Filter 403 such as a SAW filter filters the signal. Demodulating and descrambling circuitry 404 demodulates and descrambles the filtered signal under the control of data and control circuit 402. Demodulating and descrambling circuitry 404 also performs pulse detection to recover the data modulated onto the audio carrier. The data is supplied to data and control circuit 402. Volume control of the audio is performed by demodulating and descrambling circuitry 404 under the control of data and control circuit 402 and microprocessor 410 as described in U.S. Pat. No. 5,054,071, incorporated herein by reference.

The output of demodulating and descrambling circuitry 404 is an unscrambled baseband video signal which is supplied to on-screen display control circuit 406. On-screen display control circuit 406 is preferably a Mitsubishi M50556 on-screen display controller. On-screen display control circuit 406 selectively generates on-screen character displays in place of or overlaid on the video signal. Modulator 407 converts the signal containing the video, audio, and/or characters from display control 406 on channel 3/4 which is supplied to television 408.

Microprocessor 410 controls the overall operation of subscriber terminal 400. Keyboard 411 on a front panel of the subscriber terminal generates subscriber supplied signals for channel tuning, volume level, and the like which are supplied to microprocessor 410. Remote receiver 415 receives commands from IR remote 412, as is well known in the art, and provides the commands to microprocessor 410. Reset circuitry 416 resets microprocessor 410 and/or data and control circuit 402 to ensure proper operation of the system if there have been power failures, power surges, and the like. When keyboard 411 or IR remote 412 is utilized to select a channel, microprocessor 410 instructs data and control circuit 402 to appropriately control up/down converter 401 to tune the selected channel. Data and control circuit 402 utilizes recovered descrambling data to generate appropriate control signals, e.g. inversion control and sync restore signals for descrambling the input television signal. Microprocessor 410 determines whether data and control circuit 402 carries out descrambling on the basis of authorizations downloaded from system control computer. LED display 413 displays channel numbers and diagnostics. NVM 414 stores data, e.g., authorizations, terminal configurations. Subscriber terminal 400 may optionally include IPPV module 417. Module 417 allows the subscriber to authorize his or her subscriber terminal to receive a pay-per-view event, store the data associated with the purchase of that event in non-volatile memory, and transmit the data to the system operator via a telephone return path or an RF return path. The subscriber is then billed for the purchased events.

Figure 4B:
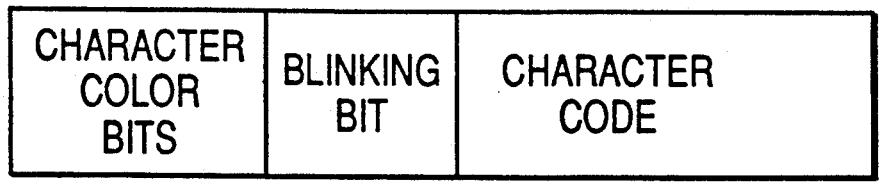
FIGS. 4B illustrates memory locations of RAM of the on-screen display of FIG. 4A.

FIGS. 4A(1) and 4A(2) are functional block diagrams of the Mitsubishi M50456 on-screen display control circuit. The on-screen display control includes character ROM 501 for storing a character set. In a preferred embodiment, character codes for generating the following sixty four characters are stored in character ROM 501:

a blank character
capital letters A-Z
cursor—icon
numbers 0-9
    (Pound sterling)
blank volume level
four volume level bars
[] ? — :$',.* #& +
single character Am Pm Ch Display RAM 502 is set with data from microprocessor 410 via serial input $S_{IN}$ to generate on screen displays using these sixty four characters. This data may be provided from a number of sources. A first source is message data from message channel data scrambler 204f. A second source is scroll channel data from scroll channel data scrambler 204e. A third source is barker data from ROM 420 of subscriber terminal microprocessor 410. Another source of display information is menu screen information stored in microprocessor ROM 420. The use of such memory screens is described in greater detail in a commonly assigned application Ser. No. 07/800,836 "Method and Apparatus for Providing an On-Screen User Interface for a Subscription Television Terminal" incorporated herein by reference. Reference may also be made to Scientific Atlanta Publication No. 69P283Z entitled: Model 8600 Set Top Terminal User's Guide" available from Scientific Atlanta and incorporated herein. Display RAM 502 includes 240 memory locations for characters to be displayed on television 408. As shown in FIG. 4B, each memory location includes a blinking bit which determines whether the character is blinking, character color bits which determine the color of the character, and a character code identifying one of the characters stored in ROM 501. The configuration of the on-screen display is shown in FIG. 4C and can be seen to consist of ten rows of twenty four characters each. The information in display RAM 502 determines what appears at each of the screen positions 1–240.

These are three modes of on-screen display control circuit. The first mode simply provides the video of a selected channel. The second mode is a video overlay mode in which character information is overlaid on the video of a selected channel. The second mode may used for example to display time, channel number, and channel identification information when a subscriber tunes to different channels. The third mode is a character mode in which character information is presented on a plain background. This mode is preferably used for messages, for example.

In accordance with the present invention, channel identification information is used to identify cable channels. The channel identification information utilizes one or more of the characters from the character set stored in character ROM 501. Preferably, the channel identification information is a three or four character channel identifier identifying the source or origin of the programming on the selected channel. Examples of channel identifiers are ABC, CBS, NBC, MTV, TBS, etc. Preferably, each subscriber terminal channel number has a channel identifier associated therewith. Of desired, one or more channel numbers may be assigned a blank channel identifier. To promote flexibility and to permit system operators to set channel identifiers particular to their respective systems, a first set of channel identification information is fixed in ROM 420 of microprocessor 410 and a second set of channel identification information may be downloaded to the subscriber terminal and stored in non-volatile memory 414. Each channel in the system is assigned a channel identifier number in order to establish a relationship between the channel number and the channel identification information. The assignment is implemented by a transaction transmission downloaded from the headend.

As noted, character identification information is stored in ROM 420 of microprocessor 410. Preferably, this information includes a set of channel identifiers identifying sources or origins of programming widely available on cable systems. In preferred embodiment, the following character identifiers are stored in microprocessor ROM. The number preceding each identifier is referred to as the channel identifier number.

| 0 "This channel is not transmitted on the cable." | | |
|---|---|---|
| 1 A&E | 22 LRN | 43 BRAV |
| 2 AMC | 23 MAX | 44 CVS |
| 3 BET | 24 MTV | 45 ACTS |
| 4 CMTV | 25 NICK | 46 WPIX |
| 5 CNBC | 26 PLAY | 47 TBS |
| 6 CNN | 27 QVC | 48 CITY |
| 7 CSP1 | 28 SHOW | 49 EDUC |
| 8 CSP2 | 29 TMC | 50 UNIV |
| 9 CVN | 30 TNN | 51 ABC |
| 10 DISN | 31 TNT | 52 CBS |
| 11 DISC | 32 TRAV | 53 FOX |
| 12 ESPN | 33 TRIN | 54 IND |
| 13 EWTN | 34 USA | 55 NBC |
| 14 FAM | 35 VH-1 | 56 PBS |
| 15 FNN | 36 VISN | 57 LOCL |
| 16 HBO | 37 WEA | 58 PUB |
| 17 HDLN | 38 WGN | 59 INFO |

| | -continued | |
|---|---|---|
| 18 HSN | 39 WWOR | 60 GUID |
| 19 INSP | 40 PPV | 61 CMDY |
| 20 LIFE | 41 PPV1 | 62 MSG |
| 21 HTS | 42 PPV2 | 63 "Blank" |

It will be readily apparent that other sets of channel identifiers and different numbers of identifiers may be utilized and the present invention is not limited in this respect. This set includes two special identifiers. Channel identifier number 63 is blank. This provides a system operator the option of not showing the channel identification information for one or more channels. Channel identifier number 0 is used for channels which are not available in the system. Thus, if a system offers 50 channels, channel number greater that 50, e.g. 68 are assigned a channel identifier number of 0 in the channel map discussed below.

Figure 5:
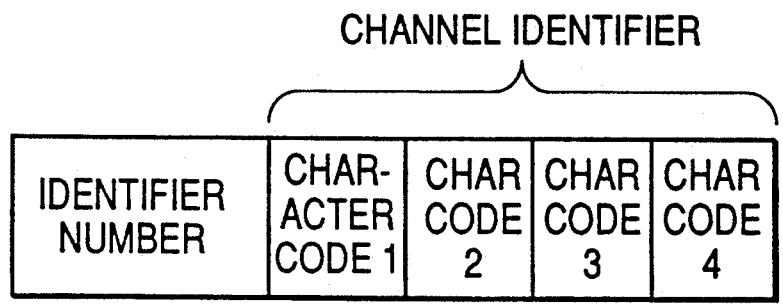
FIG. 5 illustrates a transaction sent from the headend to the subscriber terminal to provide an channel identification information.

A transaction transmission may be sent from the headend to the subscriber terminal to provide additional channel identification information. In a preferred embodiment, up to thirty additional channel identifiers may be sent to a subscriber terminal. This transaction transmission allows system operators to provide, for example, channel identifiers particular to their systems. Thus, for example, a system operator in the Washington, D.C. area may include channel identifiers WDCA, WFTY, WRC, WTTG, WJLA, and WUSA to identify local channels. The transaction transmission takes the form shown in FIG. 5. That is, the transaction transmission includes an identifier number and the character codes for each of the characters in the corresponding channel identifier. Thus, referring to the example above, the transaction transmission may include identifier 64 and the character codes for the letters WDCA, identifier 65 and the character codes for the letters WFTY, etc. This transaction may be sent globally in the System. When received, the information in this transaction transmission is forwarded to microprocessor 410 and then stored in non-volatile memory 414.

Figure 6:
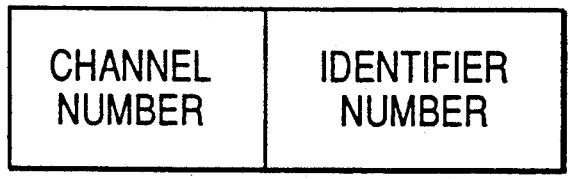
FIG. 6 illustrates a transaction sent from the headend to the subscriber terminal to establish a relationship between channel numbers and channel identifiers.

In order to establish a relationship between the channel numbers and the channel identifiers stored in non-volatile memory 414 and the ROM of microprocessor 410, a transaction transmission such as that shown in FIG. 6 may be sent from the headend to the subscriber terminals. The transaction associates each of the channel numbers in the system with one of the identifier numbers. Again referring to the example above, channel number 20 may be associated with identifier 64. Identifier 64 would then be used to find the channel identifier WDCA. This transaction transmission may be sent globally in the system. When received, the information in the transaction transmission is forwarded to microprocessor 410 and then stored in non-volatile memory 414.

Figure 9:
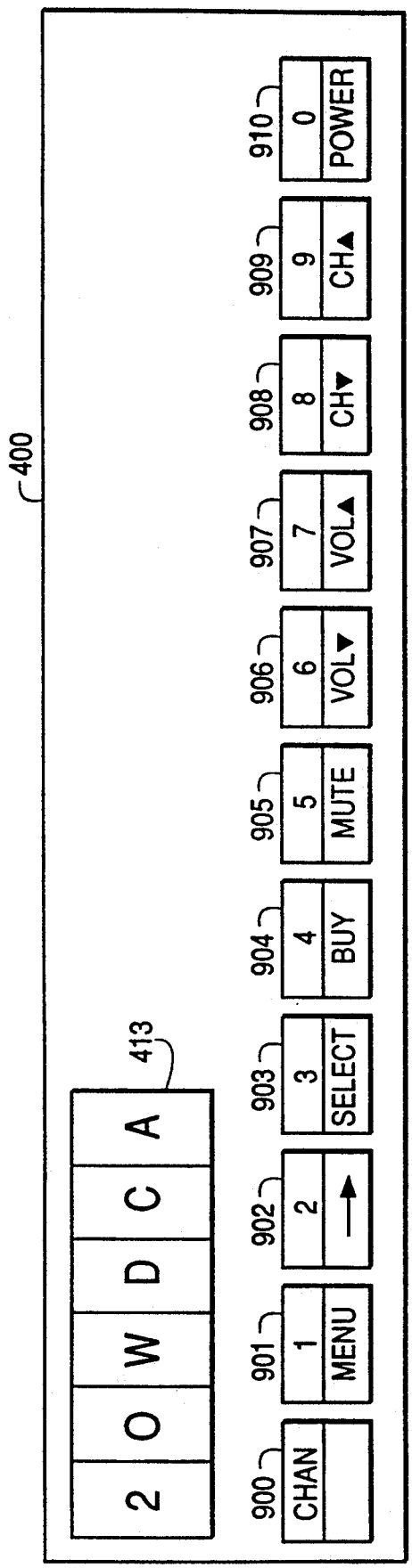
FIG. 9 is a front view of a subscriber terminal having a keyboard and having a display in accordance with the present invention.
Figure 11:
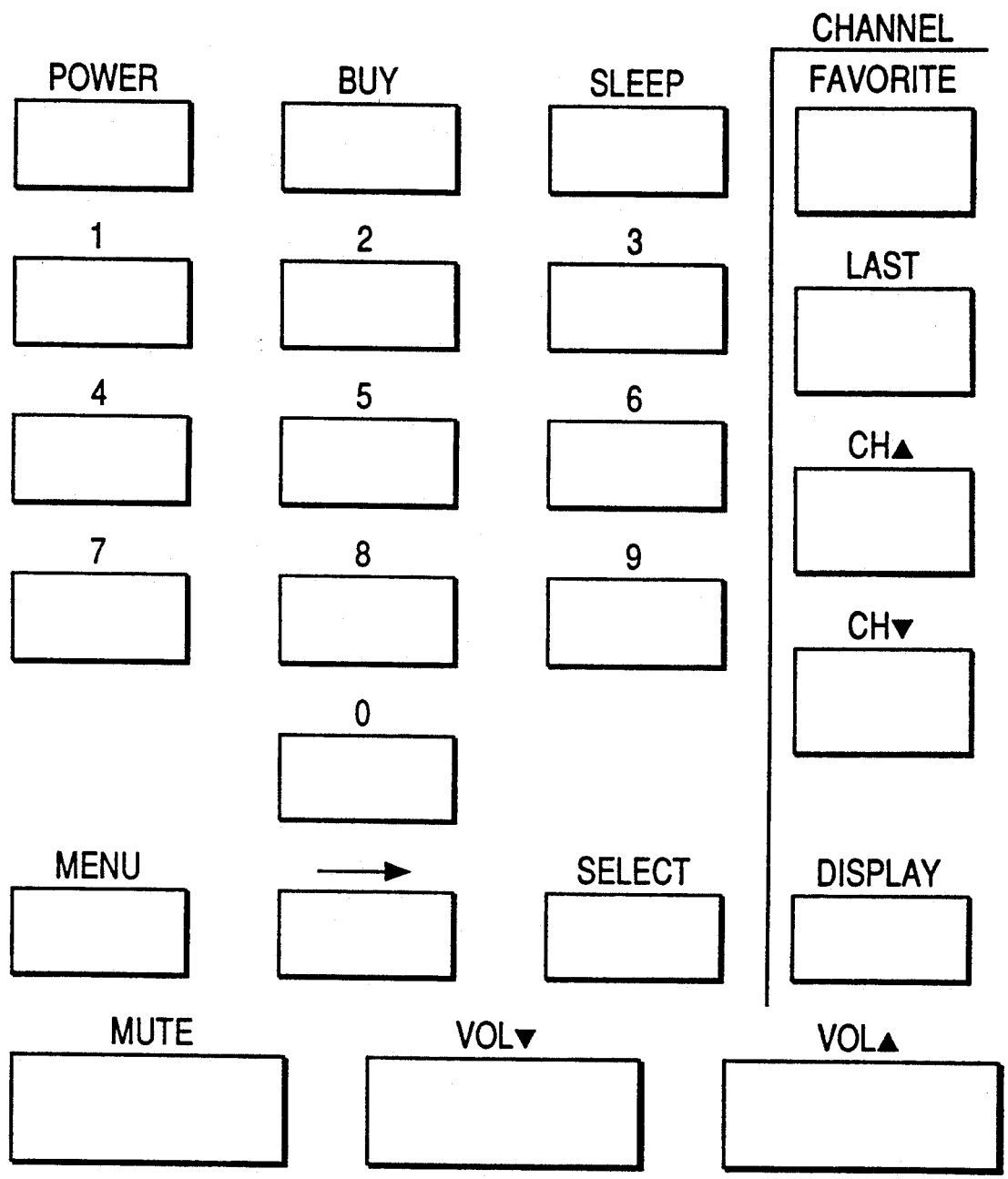
FIG. 11 illustrates a keyboard for remote control 412.

A channel may be selected by a subscriber using either keyboard 411 or IR remote 412. An exemplary subscriber terminal keyboard is illustrated in FIG. 9. Keys 901-910 are dual function keys. Thus, to select a channel, a subscriber presses CHAN key 900 followed by a desired channel number. If the CHAN key is not pressed, keys 901-910 perform other functions. Thus, the CH up-arrow and CH down-arrow keys may be used for incrementing and decrementing through channels. A schematic diagram of a keyboard for IR remote 412 is shown in FIG. 11. Channel tuning using the IR remote may be carried out by entering the channel number using the number keys. Channels may also be selected using the CH up-arrow and CH down-arrow keys. Pressing the LAST channel key tunes the channel previously selected and pressing the FAVORITE channel key tunes through a selection of stored favorite channels.

Figure 7:
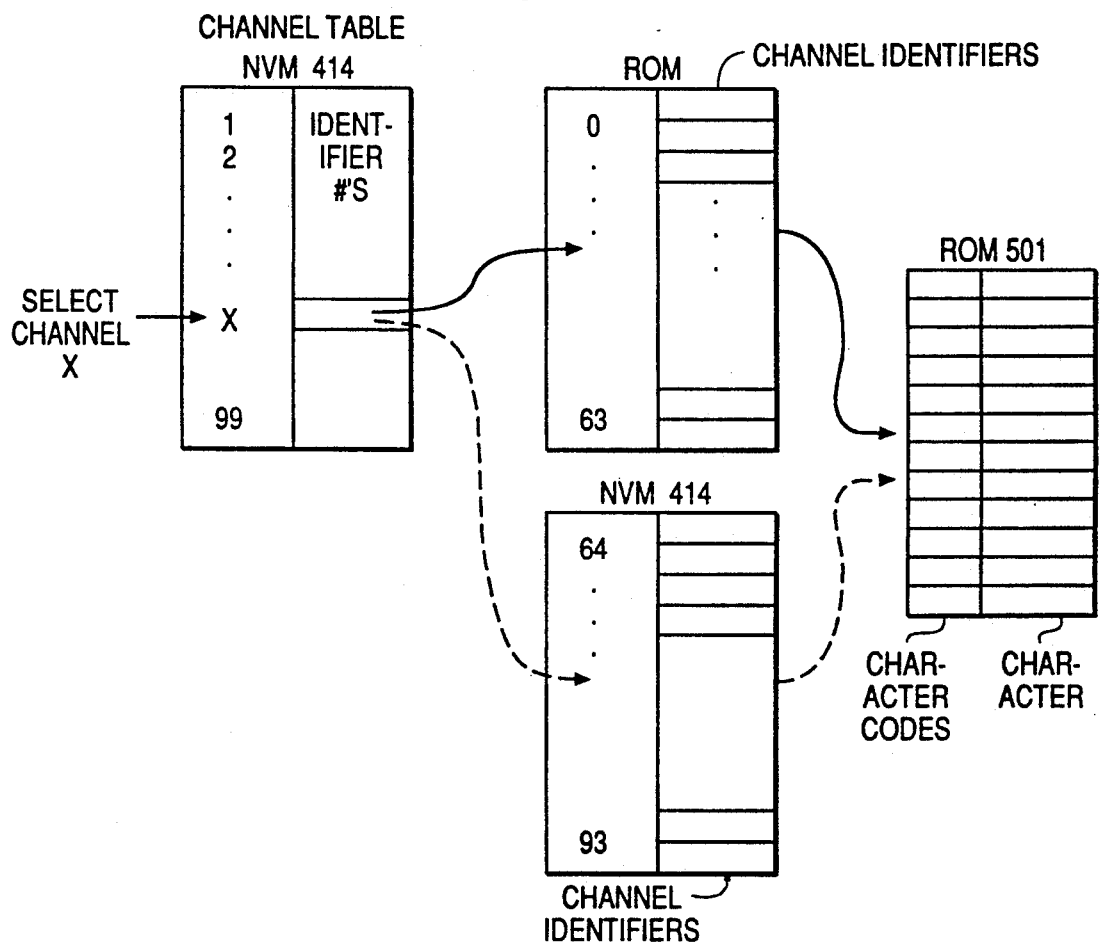
FIG. 7 illustrates the process of displaying character identification information in accordance with the present invention.

The process of displaying character identification information is explained below with reference to FIG. 7. When a subscriber selects channel X either using keyboard 411 or remote control 412, microprocessor 410 determines the corresponding identifier number by examining the channel table of non-volatile memory 414. If the identifier number is in the range 0-63, microprocessor 410 examines ROM 420 to find the character codes corresponding to the channel identifier. If the identifier number is in the range 64-93, microprocessor 410 examines non-volatile memory 414 to find the character codes corresponding to the channel identifier.

The character codes thus generated are provided to on-screen display control circuit 406, along with the character codes corresponding to the capital letters CH, the subscriber selected channel number, and the time of day. The time of day is generated by a clock of the subscriber terminal which may be set by a transaction transmission from the headend to the subscriber terminal.

It will be assumed for the purposes of this discussion that the subscriber is authorized to view the selected channel. Thus, when the subscriber selects channel X, microprocessor 410 instructs data and control circuit 402 to appropriately tune up/down converter 401. The tuned signal is filtered by filter 403 and provided to demodulating and descrambling circuit 404 for demodulation and descrambling. Demodulating and descrambling circuit 404 recovers any data pulses and supplies them to data and control circuit 402. If appropriate, data such as authorizations are forwarded from data and control circuit 402 to microprocessor 410 for processing and/or storage in NVM 414. Since it is assumed the subscriber is authorized to view the selected channel, microprocessor 410 authorizes data and control circuit 402 to descramble the selected channel, if it is scrambled, by appropriately controlling demodulating and descrambling circuit 404. The output of demodulating and descrambling circuit 404 is supplied to the CVIN input of on-screen display control circuit 406.

Figure 8:
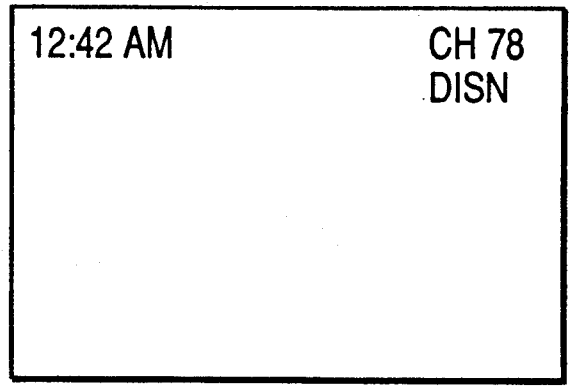
FIG. 8 illustrates an overlay indicating the time, channel number, and channel identification information.

The character codes for the time, channel number, and channel identification information are supplied to display data RAM 502. Using the character codes and the information stored in character ROM 501, characters indicating the time, channel number, and channel identification are overlaid onto the video. The overlay is shown in FIG. 8. After a predetermined period of time such as four seconds, the overlay is switched OFF.

FIG. 9 illustrates display 413 which may be utilized in accordance with the present invention. Display 413 may, for example, be a six character LED display and may be used to display channel identification information. Thus, when a subscriber selects channel 20 either using keyboard 411 or remote control 412, microprocessor 410 determines the corresponding channel identification information in accordance with the procedure detailed above. Using this information, microprocessor 410 controls LED display 413 to display the selected channel number (20) and the corresponding channel identification information (WDCA). If a four digit display is used, the channel identification information may be displayed for a predetermined time period, followed by display of the channel number. Alternatively, the channel number may be displayed for a predetermined time period followed by display of the channel identification information. This feature may be used in place of or to supplement the on-screen display discussed above.

Figure 10:
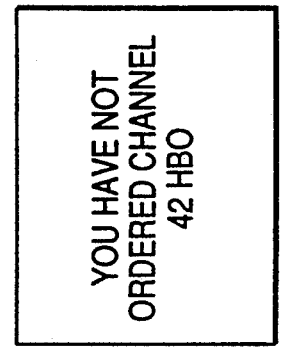
FIG. 10 illustrates a barker screen utilizing channel identification information.

The display of channel identification information is not limited to only when a subscriber selects channels for viewing. It may be presented at any desired time. Thus, another implementation of channel identification information is in displays of barker information. For example, if a subscriber were to select a channel which is available in the cable system, but for which the subscriber is not authorized, microprocessor 410 supplies appropriate barker character information, channel number, the channel identification information corresponding to the channel number, and background color information to on-screen display control 406 to generate a barker as shown in FIG. 10. Additional details of barkers screens may be found in the commonly assigned application Ser. No. 07/799,987 entitled "Method and Apparatus for Providing Message Information to Subscribers in a Cable Television Terminal".

The channel identification information may also be used when an on-screen menu is used for channel selection, such as favorite channels, parental control channels, and program timer channels. A menuing system implementing these features is described in a commonly assigned application Ser. No. 07/800,836 entitled "Method and Apparatus for Providing an On-Screen User Interface for a Subscription Television Terminal", incorporated herein by reference.

Also, the television screen may be blanked for a period such as one-half second, during a channel change to mask the poor picture quality while the new channel is being tuned. The channel identification information may appear on the blank screen to inform the user what will be tuned before it is visible on the screen. The channel identification information may be visible during high speed channel increment or channel decrement so the subscriber can identify the channels as they are passed.

Figures 12, 13:
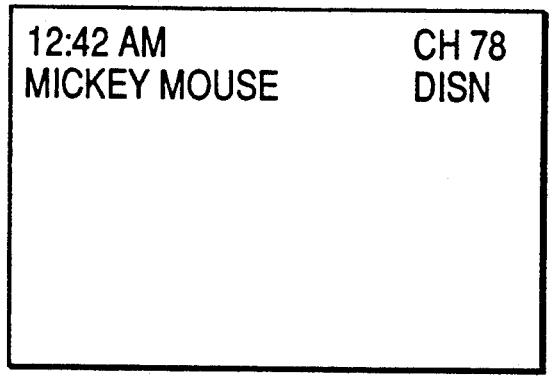
FIG. 12 illustrates a memory configuration for generating a display of program identifiers such as program titles.
FIG. 13 illustrates an overlay indicating the time, channel number, channel identification information, and program identification information in accordance with the present invention.

Additionally, the channel identification information is not limited to the channel identifiers discussed above. Thus, in accordance with another embodiment of the present invention, program identification information may be presented. To implement this feature, NVM 414 is downloaded with information from the headend which is arranged as shown in FIG. 12. Thus, NVM 414 would include identifier numbers, times, and program identifiers. Each channel number is associated with one or more identifier numbers. When a channel is selected for viewing, the appropriate identifier number is retrieved and a comparison is done between a current real time determined by a system clock and a time stored in NVM 414 indicating when the associated program identification information is active. This program identification information may include, but is not limited to, program titles. Microprocessor 410 then retrieves the appropriate program identifier and supplies the information, along with the real time, the channel number, and the character codes for the letters CH to on-screen display 406. Thus, an on-screen overlay such as illustrated in FIG. 12 may be generated.

It is to be understood that the invention is not limited to the illustrations described and shown herein which are deemed to be merely illustrative. The invention rather is intended to encompass all such modifications which are within its spirit and scope as defined by the appended claims.

We claim:

1. A terminal device for use with a television receiver having a display screen, said terminal device comprising:
    tuning means for tuning signals having picture information corresponding to respective channels;
    channel selecting means for selecting channels of the respective channels;
    storing means for storing a table including channel identification information items and identifier numbers respectively corresponding to each one of the channel identification information items and for storing a map for mapping channel numbers corresponding to the respective channels to the identifier numbers;
    a processor responsive to said channel selecting means for controlling said tuning means to tune a selected one of the channels and for utilizing said may and said table to determine the item of channel identification information corresponding to the selected channel; and
    a display screen control circuit responsive to said processor for controlling said display screen to display a channel identifier corresponding to the determined item of channel identification information.

2. The terminal device according to claim 1, wherein the channel identifier comprises alphanumeric display characters.

3. The terminal device according to claim 1, wherein the channel identifier comprises up to four display characters.

4. The terminal device according to claim 1, wherein said display screen control circuit further controls said display screen to display time of day information when the channel identifier is displayed.

5. The terminal device according to claim 1, wherein said display screen control circuit includes a read only memory for storing a predetermined display character set.

6. The terminal device according to claim 5, wherein each of the character identification information items stored in said table comprises at least one character code corresponding to characters in the character set stored in said read only memory of said display screen control circuit.

7. The method according to claim 6, wherein the channel identifier comprises alphanumeric display characters.

8. The method according to claim 6, wherein the channel identifier comprises up to four display characters.

9. The method according to claim 6, wherein the step of storing said table comprises storing a preprogrammed portion of said table in a read only memory.

10. The method according to claim 6, wherein the step of storing said table comprises storing at least a portion of said table in a non-volatile memory.

11. The method according to claim 6, wherein the step of storing said table comprises storing a first portion of said table in a read only memory and storing a second portion of said table in a non-volatile memory different than said read only memory.

12. The terminal device according to claim 1, wherein said table of said storing means stores a set of 93 channel identification information items.

13. The terminal device according to claim 1, wherein said storing means comprises a read only memory of said processor for storing a preprogrammed portion of said table.

14. The terminal device according to claim 13, wherein said storing means comprises a non-volatile memory for storing at least a portion of said table.

15. The terminal device according to claim 14, wherein said non-volatile memory stores a portion of said table including up to thirty channel identification information items.

16. The terminal device according to claim 14, wherein said read only memory stores a preprogrammed portion of said table including up to sixty-three channel identification information items.

17. The terminal device according to claim 1, wherein said display screen control circuit controls said display screen to display the channel identifier for a predetermined period of time.

18. The terminal device according to claim 17, wherein the predetermined period of time is approximately four seconds.

19. The terminal device according to claim 1, wherein said storing means includes a read only memory for storing a preprogrammed portion of said table and a non-volatile memory for storing a portion of said table downloadable from an external source.

20. The terminal device according to claim 1, wherein said display screen is a rectangular screen and said display screen control circuit controls said display screen to display the channel identifier adjacent a corner thereof.

21. A method for displaying channel identifiers on a television receiver having a display screen in a system with signals having picture information corresponding to respective channels, the method comprising the steps of:
    storing a table including channel identification information items and identifier numbers respectively corresponding to each one of the channel identification information items;
    storing a map for mapping channel numbers corresponding to the respective channels to the identifier numbers;
    tuning a selected channel;
    utilizing said map and said table to determine the item of channel identification information corresponding to the selected channel; and
    displaying a channel identifier corresponding to the determined item of channel identification information on said display screen.

22. The method according to claim 21, wherein the step of storing a map for mapping channel numbers comprises storing a map in a non-volatile memory.

23. Apparatus for use in a system for transmitting signals having picture information corresponding to respective channels and having a terminal device including storing means for storing a first table including a set of channel identification information items and identifier numbers respectively corresponding to each one of the channel identification information items, said apparatus comprising:
    map generating means for generating a map for mapping the channel numbers corresponding to the respective channels to the identifier numbers in said first table;
    transmitting means for transmitting said map to said terminal device.

24. The apparatus according to claim 23, further comprising:
    means for generating a second table including additional channel identification items and identifier numbers respectively corresponding to each one of the additional channel identification information items, and
    wherein said map generating means generates a map for mapping the channel numbers corresponding to the respective channels to the identifier number in the first and second tables and said transmitting means transmits the second table and said map to said terminal device.

25. A method of providing channel information in a system for transmitting signals having picture information corresponding to respective channels to a terminal device, said terminal device including storing means for storing a first table including channel identification information items and identifier numbers respectively corresponding to each one of the channel identification information items, the method comprising the steps of:
    generating a map for mapping the channel numbers corresponding to the respective channels to the identifier number s in said first table;
    transmitting said map to said terminal device.

26. The method according to claim 25, further comprising the step of:
    generating a second table including additional channel identification items and identifier numbers respectively corresponding to each one of the additional channel identification information items, and
    wherein the step of generating a map comprises generating a map for mapping the channel numbers corresponding to the respective channels to the identifier numbers in the first and second tables and the step to transmitting comprises the step of transmitting the second table and said map to said terminal device.

27. A television system comprising:
    a terminal device for use with a television receiver having a display screen, including:
        tuning means for tuning signals having picture information corresponding to respective channels;
        channel selecting means for selecting channels of the respective channels;
        storing means for storing a table including channel identification information items and identifier numbers respectively corresponding to each one of the channel identification information items and for storing a map for mapping channel numbers corresponding to the respective channels to the identifier numbers;
        a processor responsive to said channel selecting means for controlling said tuning means to tune a selected one of the channels and for utilizing said map and said table to determine the item of channel identification information corresponding to the selected channel; and
        a display screen control circuit responsive to said processor for controlling said display screen to display a channel identifier corresponding to the determined item of channel identification information; and
    a system control apparatus remotely located with respect to said terminal device, said apparatus comprising:
        map generating means for generating said map for mapping the channel numbers corresponding to the respective channels to the identifier numbers in said table;

transmitting means for transmitting said map to said terminal device.

28. A method of providing channel information in system for transmitting signals having picture information corresponding to respective channels to a terminal device, said terminal device including storing means for storing a table including channel identification information items and identifier numbers respectively corresponding to each one of the channel identification information items, the method comprising the steps of;

generating a map at a system control location for mapping the channel numbers corresponding to the respective channels to the identifier numbers in said table;

transmitting said map to a terminal device at a location remote from said system control location;

storing a table at said terminal device including channel identification information items and identifier numbers respectively corresponding to each one of the channel identification information items;

storing said map transmitted by said system control location at said terminal device;

tuning a selected channel;

utilizing said map and said table to determine the item of channel identification information corresponding to the selected channel; and displaying a channel identifier corresponding to the determined item of channel identification information on a display screen of a television receiver associated with said terminal device.

29. A terminal device, comprising:

tuning means for tuning signals having picture information corresponding to respective channels;

channel selecting means for selecting channels of the respective channels;

storing means for storing a table including channel identification information items and identifier numbers respectively corresponding to each one of the channel identification information items and for storing a map for mapping channel numbers corresponding to the channels to the identifier numbers;

a display;

a processor responsive to said channel selecting means for controlling said tuning means to tune a selected one of the channels, for utilizing said table and said map to determine the item of channel identification information corresponding to the selected channel, and for controlling said display to display a channel identifier corresponding to the determined item of channel identification information.

30. The terminal device according to claim 29, wherein said display is an LED display.

31. A terminal device for use with a television receiver having a display screen, said terminal device comprising:

a clock;

tuning means for tuning signals having picture information corresponding to respective channels;

channel selecting means for selecting channels of the respective channels;

storing means for storing a table including program identification information items, times respectively corresponding to each one of the program identification information items, and identifier numbers respectively corresponding to each one of the programmed identification information items and for storing a map for mapping channel mumbers corresponding to the respective channels to the identifier numbers;

a processor responsive to said channel selecting means for controlling said tuning means to tune a selected one of the channels and for utilizing said map, said table, and a time of said clock to determine the item of program identification information currently corresponding to the selected channel; and a display screen control circuit receiving the determined item of program identification information and controlling said display screen to display a program identifier corresponding to the item of program identification information.

32. The terminal device according to claim 31, wherein said display screen is a rectangular display screen and said display screen control circuit controls said display screen to display the program identifier adjacent a corner thereof.

* * * * *